W. A. DENNEY.
MOLDING MACHINE.
APPLICATION FILED OCT. 10, 1917.
1,255,586.
Patented Feb. 5, 1918.
4 SHEETS—SHEET 2.
Fig. II.
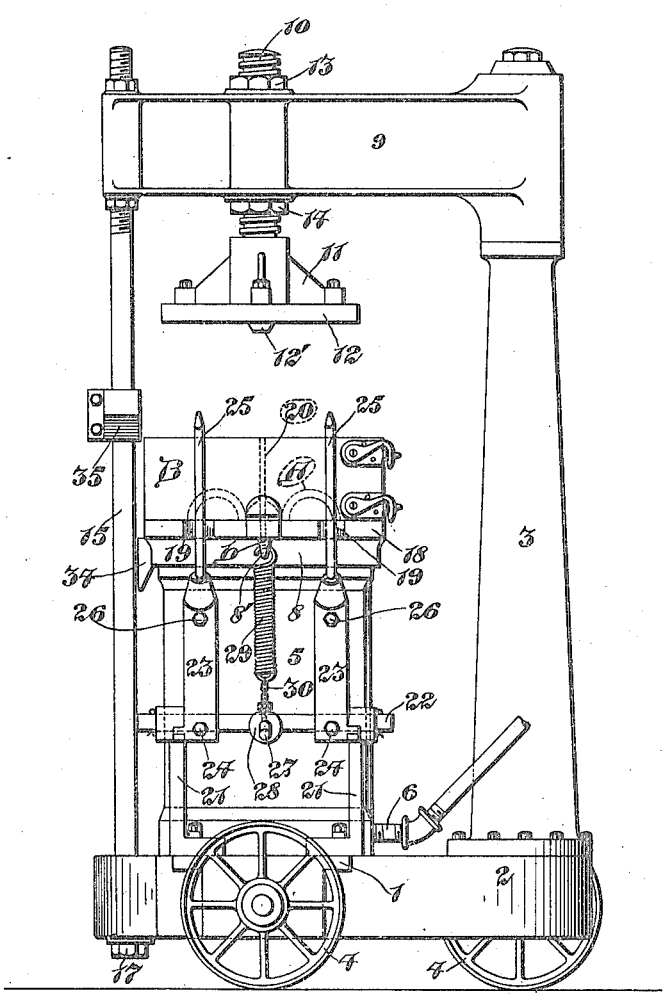
Attest.
Charles A. Becker
Inventor
W. A. Denney,
by
Knight & Cook
His Attorneys.

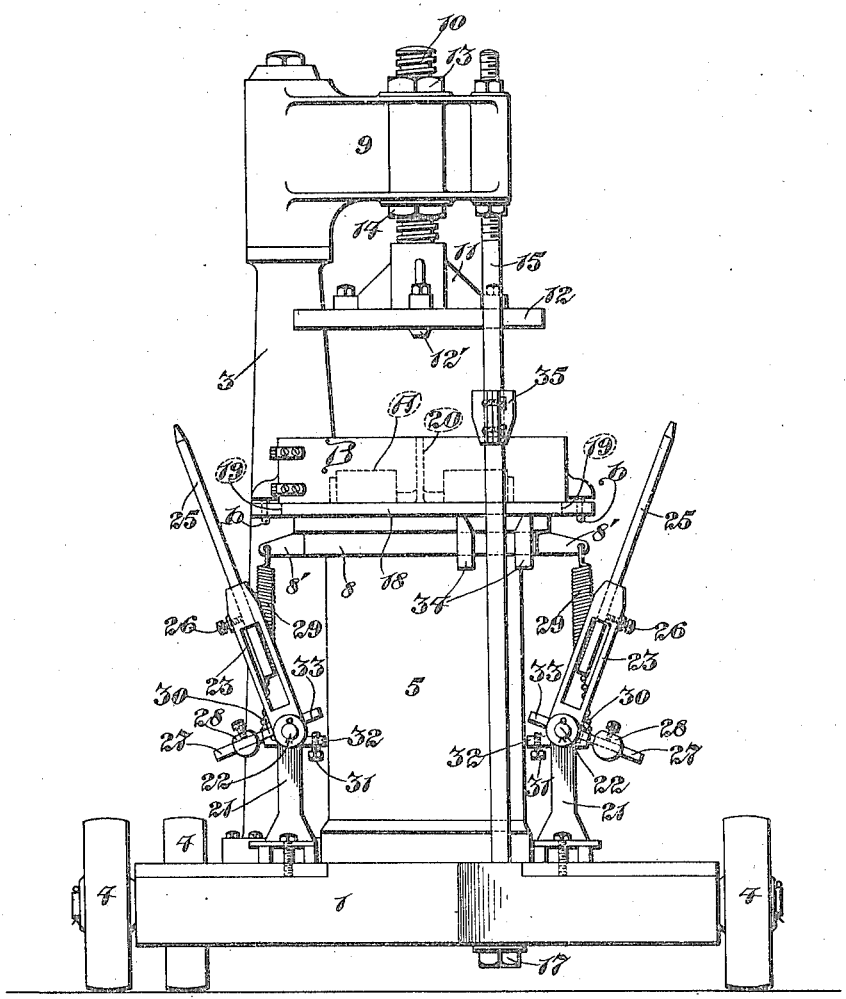

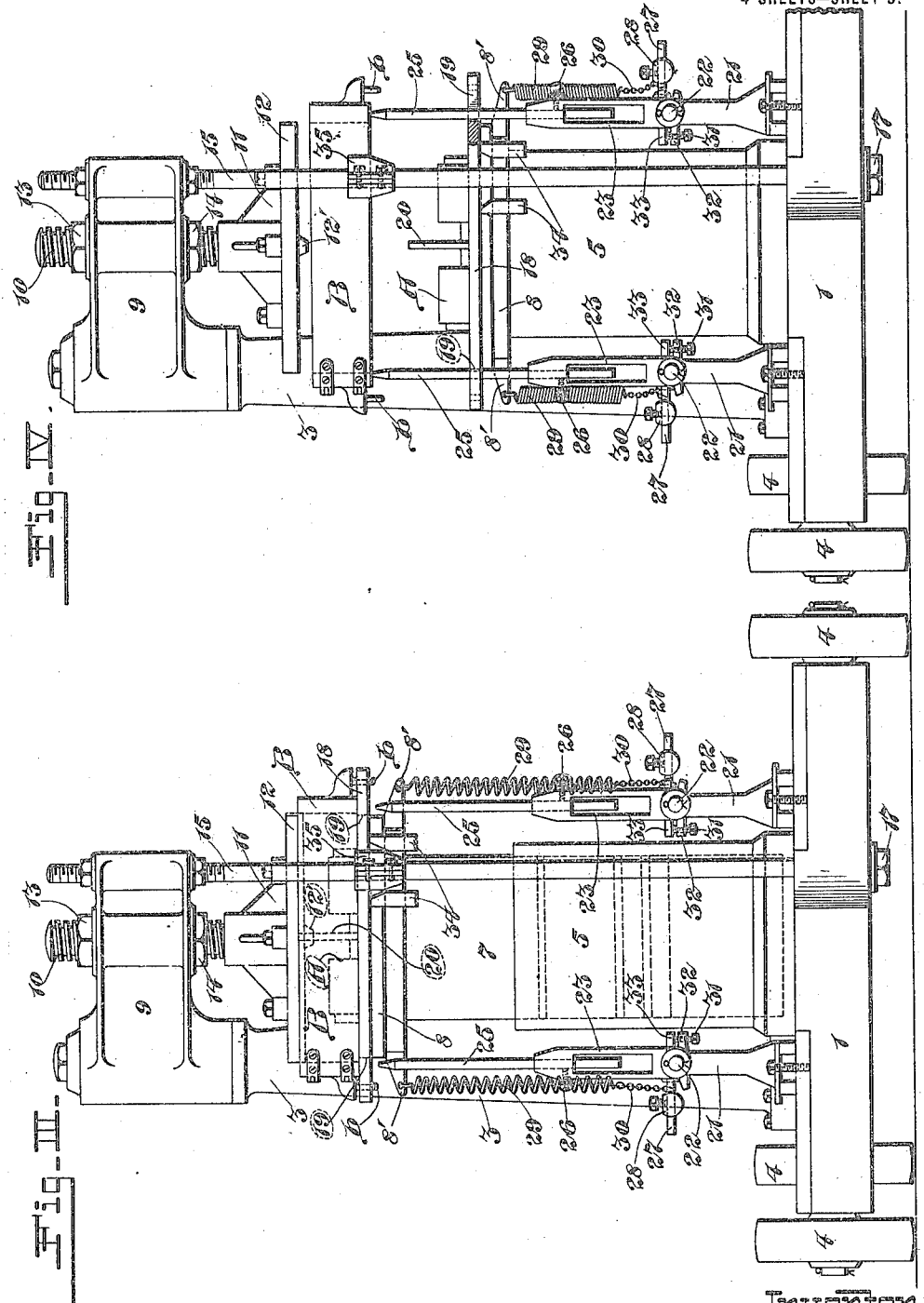

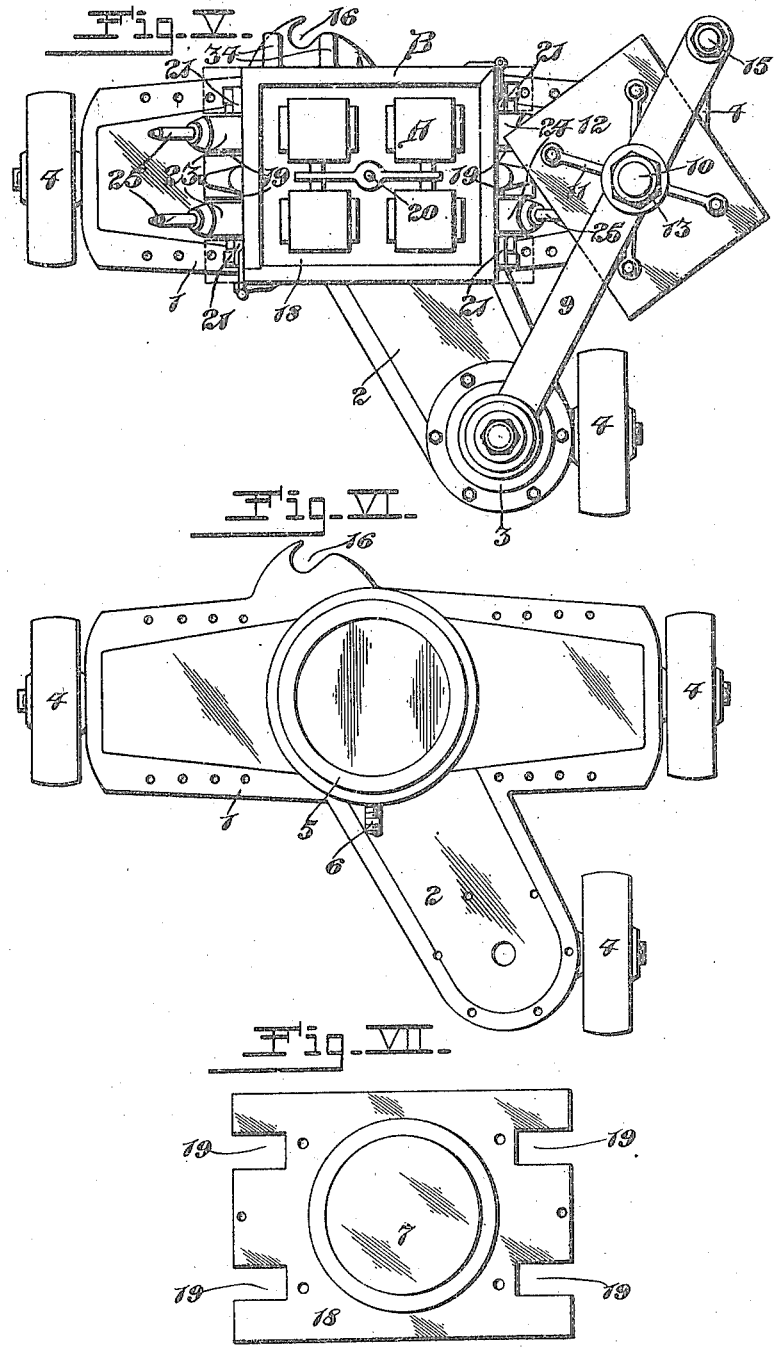

UNITED STATES PATENT OFFICE.

WILLIAM A. DENNEY, OF QUINCY, ILLINOIS.

MOLDING-MACHINE.

1,255,586.　　　　Specification of Letters Patent.　　Patented Feb. 5, 1918.

Application filed October 10, 1917.　Serial No. 195,695.

*To all whom it may concern:*

Be it known that I, WILLIAM A. DENNEY, a citizen of the United States of America, a resident of Quincy, in the county of Adams, State of Illinois, have invented certain new and useful Improvements in Molding-Machines, of which the following is a full, clear, and exact description, reference being had to the accompanying drawings, forming a part of this specification.

My invention relates to that character of molding machines by which the sand in sand molds is subjected to pressure by mechanical power, and has mainly for its object to provide simple and efficient automatic mechanism for separating the flask and the mold from the pattern.

Figure I is a front elevation of my molding machine with the parts in the positions assumed when a flask has been filled with sand, and prior to pressing action.

Fig. II is a side elevation with the parts in the positions shown in Fig. I.

Fig. III is a front elevation with the parts shown as they appear at the completion of the molding operation.

Fig. IV is a view similar to Fig. III, showing the flask sustained in its elevated position and the pattern plate returned to its lowered position.

Fig. V is a top plan view.

Fig. VI is a top plan view of the platform and cylinder.

Fig. VII is a top plan view of the pattern plate.

In the drawings, 1 designates a platform of a construction suitable for supporting the operative elements of my molding machine, said platform including an arm 2 on which a column 3 is mounted. The platform may, for portability, be supported by wheels 4. 5 is a cylinder into which pressure fluid, for example air, may be introduced through the medium of a pipe 6 leading from any suitable source of supply to the cylinder. A piston 7, operable in said cylinder 5, is provided at its upper end with a table or head 8, raised and lowered during vertical movement of said piston.

The column 3 is offset laterally from the cylinder 5 and is provided at its upper end with a circular portion to which an arm 9 is rotatably fitted. Said arm 9 is adapted to be swung to and from a position over the table 8, and in the arm is a vertical screw threaded aperture which receives a screw rod 10, to the lower end of which is fixed a presser head holder 11 having secured thereto a presser head 12. The screw rod 10 may be adjusted vertically to locate the presser head 12 at any desired elevation, and after such adjustment the screw rod is held from turning by suitable means, such as jam nuts 13 and 14 on the rod, adapted to seat against the upper and lower faces of the arm 9.

15 designates a vertical strain rod mounted in the arm 9 and depending therefrom, said rod being adapted to enter a recess 16 in the platform or base 1 when the arm 9 has been swung to a position providing for the presser head 12 overhanging the table on the piston 7. At the lower end of the strain rod is a head 17 adapted to bear against the lower face of the platform or base 1, thereby rendering the strain rod effective as a strain resisting member when upward pressure is exerted against the presser head 12.

The parts of my molding machine thus far described are all old, and no invention, *per se*, is herein claimed for them.

18 designates a pattern plate mounted on the table 8, carried by the piston 7, said pattern plate being adapted to support patterns A and being provided with notches 19, which extend into the plate from its side edges (see Figs. IV and VII). B designates a flask adapted to be seated on the pattern plate 18 and held from lateral movement thereon by suitable means, such as tenons *b*. This flask may be of any ordinary description, such as commonly used for sand molding operations.

The pattern plate 18 is provided with a vertical sprue 20, and it may also be here stated that the presser head 12 is provided at its lower face with a gate-forming projection 12′ to which said sprue may be presented when the flask B is elevated and the sand therein is pressed between the pattern plate and the presser head 12.

21 designate posts arranged in pairs upon the platform or base at the sides of my machine. These posts serve as supports for rock shafts 22, which are journaled in bearings at the upper ends of the posts. 23 are rocker arms adjustably secured to the rock shafts 22 by set screws 24 (see Fig. II), thereby permitting adjustment of the rocker arms longitudinally of said rock shafts. 25 are flask rests carried by the rocker arms 23, said rests being preferably in the form of rods and being adjustably secured to the rocker arms by suitable means, such as set screws 26.

The rock shafts 22 have secured to them arms 27, preferably supplied with weights 28 which serve to tilt the rocker arms 23 outwardly and hold them in the positions in which they are seen in Figs. I and II when the piston 7 is in its lowered position. To provide for rotation of the rock shafts 22 and the movement of the rocker arms 23 and the flask rests 25 to upright positions when the piston 7 and the parts carried thereby are elevated, I provide connectors between the table 8 and the weighted arms 27, said connectors comprising springs 29 and flexible pull members 30, the table 8 being furnished with extensions 8′ to which one of the connection members of each connector is attached and the other connection member being secured to the weighted arm 27 at the same side of the machine. The flask rests 25 move into the notches 19 in the pattern plate 18 when they are drawn to their vertical positions, and the movement of these flask rests and the rocker arms 23 by which they are carried is limited by stop screws 31 extending vertically through lugs 32 projecting from the posts 21, said stop screws being adapted to be engaged by stop fingers 33 rotatable with the rock shafts 22.

34 designates a pair of cheeks vertically arranged on the table 8 carried by the piston 7, these cheeks being parallel with each other and being so located and spaced apart as to permit of the strain rod 15 moving between them when the arm 9 is adjusted to position the presser head 12 over the table 8, and locate the strain rod in the recess 16 contained by the platform or base 1. The cheeks 34 have inclined surfaces facing each other, which are adapted to be engaged by a tapered collar 35 secured to the strain rod 15 when the flask resting on the table 8 is elevated to bring the sand in the flask against the presser head 12 for pressing action in molding such sand.

In the practical use of my molding machine the operation is as follows:

The pattern plate 18, having a pattern A thereon, being in position upon the table 8, and the flask B having been mounted on said pattern plate, the operator fills the flask with sand and strikes it off ready for the molding operation. At this time the parts of the machine are in the positions in which they appear in Figs. I and II. Operating medium is then admitted to the cylinder 5 and the piston 7 is elevated, with the result of lifting the filled flask upwardly to the position shown in Fig. III and creating sufficient pressure to produce the desired mold. During the upward movement of the parts, as explained, the table 8 acts to exert a pull upon the springs 29 connected thereto, and said springs, together with the flexible pull members 30, serve to impart rotation to the rock shafts 22 whereby the rocker arms 23 and the flask rests 25 are brought into vertical positions, as seen in Fig. III, with their upper ends occupying positions beneath the flask and spaced therefrom. Following the production of the mold in the flask the piston 7 is lowered, and as it moves downwardly the flask B travels with the pattern plate 18 until it is caught upon the upper ends of the rests 25, and when it is so caught it remains supported by said rests while the pattern plate and pattern thereon move out of the mold and descend to the position shown in Fig. IV. The flask rests 25 being separated from the flask when it is in its highest position, sufficient downward movement of the flask occurs before it becomes seated on the rests to permit of clearance between the presser head 12 and the flask so that the presser head may be swung with the arm 9 to the position shown in Fig. V to permit the removal of the flask with the molded sand therein. When the flask is removed the rests 25 automatically move outwardly to the positions shown in Fig. I, to remain in such position until the next operation of the machine. To provide against restraint to the outward movement of the flask rests and the rocker arms 23 by which they are carried, the flexible pull members 30 are made of such length that they will be slack when the flask rests are in vertical positions, and as a consequence the weighted arms 27 are permitted to perform the function of imparting outward movement to the rocker arms 23 and flask rests 25.

The cheeks 34, movable with the flask supporting table 8, by coöperating with the collar 35 on the strain rod 15 when the flask is elevated to the presser head 12, serve to lock the flask carrying table and the strain rod to each other, and by so doing prevent the operator of the machine from moving the arm 9 and the strain rod 15 out of their operative positions until the flask has been sufficiently lowered so that it and the sprue 20 therein will be disengaged from the presser head 12 and the gate-forming member 12′ carried thereby, thus eliminating possibility of injury to the mold by disturbance of the sand in the flask.

The posts 21 are adapted to be adjusted on the platform or base of the machine to suit their positions to various sized flasks, such adjustment being permitted by providing a plurality of holes in the base in any of which the screws or bolts passing through the feet of the posts may be seated.

I claim:

1. A molding machine comprising a presser member, a flask elevating member beneath said presser member, and means for supporting a flask when said elevating member is lowered after molding operation, said supporting means being operable in response to movements of said elevating member.

2. A molding machine comprising a presser member, a flask elevating member beneath said presser member, and automatically operable means for supporting a flask in elevated position when said flask elevating member is lowered after molding operation.

3. A molding machine comprising a presser member, a flask elevating member beneath said presser member, and means operable by said flask elevating member for supporting a flask in elevated position when said flask elevating member is lowered after molding operation.

4. A molding machine comprising a presser member, a flask elevating member beneath said presser member, and rockably supported flask rests operable in response to movements of said elevating member into positions to support the flask in an elevated position when said flask elevating member is lowered after molding operation.

5. A molding machine comprising a presser member, means for elevating a flask to said presser member, flask rests movable into positions to support a flask independently of the flask elevating means, and connections between said flask rests and said flask elevating means, said connections permitting the movement of said flask rests to and from positions in which they may be engaged by a flask raised by said flask elevating means.

6. A molding machine comprising a presser member, flask elevating means movable toward and away from said presser member, movable flask rests by which a flask may be supported in elevated position when said flask elevating means is lowered relative to said presser member, and means for operating said flask rests including yieldable members having connection with said flask elevating means.

7. A molding machine comprising a presser member, flask elevating means movable vertically toward said presser member, rockable flask supporting members adapted to be positioned beneath a flask when it has been elevated to said presser member, and yieldable connections between said flask elevating means and said rockable flask supporting means, whereby said flask supporting means are moved into positions beneath the flask on the elevating means while said elevating means is being moved toward said presser member.

8. A molding machine comprising a presser member, flask elevating means movable toward said presser member, rockable flask supporting members, and springs connecting said flask supporting members to said flask elevating means adapted to move the flask supporting members into positions beneath the flask on said elevating means while the flask is being elevated to said presser member.

9. A molding machine comprising a presser member, a flask elevating member beneath said presser member, a pair of rock shafts, and means on said rock shafts cooperable with said flask elevating means for supporting a flask when it has been elevated to said presser member, said rock shafts having associated therewith means whereby the flask supporting members are returned to inoperative positions when the flask they serve to support is separated from the flask supporting members.

10. A molding machine comprising a presser member, a flask elevating member beneath said presser member, a pair of rock shafts, flask supporting members carried by said rock shafts, means operable by said flask elevating member for moving said flask supporting members into flask supporting positions, and weighted arms for returning said flask supporting members to inoperative positions.

11. A molding machine comprising a presser member, a flask elevating member beneath said presser member, a pair of rock shafts, flask supporting members carried by said rock shafts, means operable by said flask elevating member for moving said flask supporting members into flask supporting positions, weighted arms for returning said flask supporting members to inoperative positions, and adjustable stops for limiting the movement of said flask supporting members when they are adjusted to flask supporting positions.

12. A molding machine comprising a presser member, a flask elevating member beneath said presser member, adjustably mounted posts, movable flask supporting members supported by said posts, and means coöperable with said flask elevating member for moving said flask supporting members into positions where they will serve to support a flask after it has been raised by said flask elevating member.

13. A molding machine comprising a flask elevating member, a swingingly supported presser member adapted to be positioned above said flask elevating member, and means for locking said presser member against movement relative to said flask elevating member until the elevating member has been lowered a predetermined distance after the production of a mold in the flask.

14. A molding machine comprising a base, an arm swingingly supported by said base, a presser member supported by said arm, a flask elevating member by which a flask may be raised to said presser member, a strain rod for connecting said arm to said base, and coöperable means associated with said flask elevating member and said strain rod whereby said arm may be held from movement pending the lowering of said flask elevating member relative to said presser member.

15. A molding machine comprising a base, an arm swingingly supported by said base, a presser member supported by said arm, a flask elevating member by which a flask may be raised to said presser member, a strain rod for connecting said arm to said base, and coöperable means associated with said flask elevating member and said strain rod whereby said arm may be held from movement pending the lowering of said flask elevating member relative to said presser member, said last named means comprising a pair of cheeks carried by said flask elevating member and a collar carried by said strain rod.

16. A molding machine comprising a base, an arm swingingly supported by said base, a presser member supported by said arm, a flask elevating member by which a flask may be raised to said presser member, a strain rod for connecting said arm to said base, and coöperable means associated with said flask elevating member and said strain rod whereby said arm may be held from movement pending the lowering of said flask elevating member relative to said pressed member, said last mentioned means comprising a pair of cheeks carried by said flask elevating member having inclined portions and a tapered collar carried by said strain rod adapted to engage the inclined portions of said cheeks.

In testimony that I claim the foregoing I hereunto affix my signature.

WILLIAM A. DENNEY.

Copies of this patent may be obtained for five cents each, by addressing the "Commissioner of Patents, Washington, D. C."